3,064,384
PULLEY RINGS FOR PURSE SEINES
Wallace E. Lewis, Beaufort, N.C., and Hanna R. Humphreys, Jr., White Stone, Va. (both % Standard Products Co., White Stone, Va.)
Filed Apr. 7, 1961, Ser. No. 101,458
2 Claims. (Cl. 43—14)

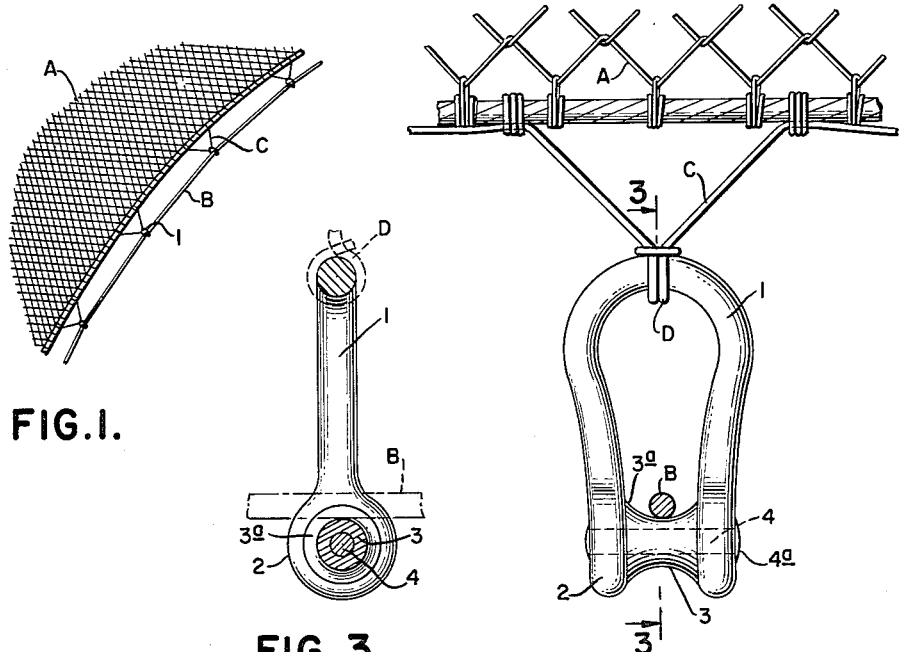
FIG.1.
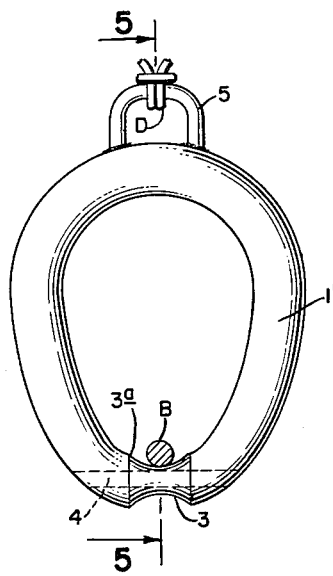
FIG.3.
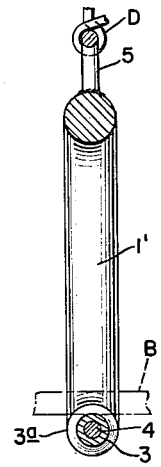
FIG.2.
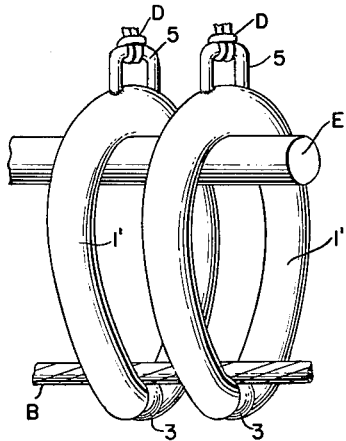
FIG.5.
FIG.6.
FIG.4.
INVENTORS
Wallace E. Lewis &
Hanna R. Humphreys, Jr.
BY *J. Hanson Boyden*
ATTORNEY United States Patent Office 3,064,384
Patented Nov. 20, 1962

This invention relates to fishing nets, and more particularly to purse seines.

For many years it has been the common practice to secure a series of plain rings along the lower edge of a purse seine, and pass a purse line through these rings, this purse line being operatively connected at its ends to suitable winding or pulling mechanism so that the bottom of the seine may be drawn together or closed when desired. It is not unusual for fifty or more rings to be employed on a seine of commercial size.

It has been found in practice that the frictional drag on the line running through this series of rings is very great, imposing a tremendous load on the pulling mechanism, and thus unduly increasing the difficulty of properly drawing in the seine. Moreover, the friction frequently wears through some of the rings, thus rendering them useless, and also produces excessive wear on the line. This presents a serious problem, where, as in recent years, extensive use has been made of nylon lines, which are relatively expensive.

It is therefore the general object of the present invention to overcome these objections and difficulties by providing means for effectively reducing the frictional drag on the line and the excessive wear on the rings and on the line. This we achieve by substituting for the ordinary ring heretofore employed what, for lack of a better name, we shall call "pulley rings" or "roller rings." These comprise a clevis or shackle in which is mounted a pulley or roller over which the line passes.

A specific object of the invention is to devise such a pulley ring which shall be simple and rugged in construction, and shall be completely "non-fouling," that is to say shall be entirely free from any sharp edges or projections on which the line or net might catch or become entangled or cut.

With the above and other objects in view, and to improve generally on the details of such equipment, the invention consists in the construction and combination of parts hereinafter described and claimed, and illustrated in the accompanying drawing, forming part of this specification, and in which:

FIG. 1 is a fragmentary view of a purse seine, showing the purse line passing through our improved pulley rings, attached to the seine;

FIG. 2 is an enlarged side elevation of one of our improved pulley rings, showing a fragment of the seine to which it is attached;

FIG. 3 is a longitudinal section substantially on the line 3—3 of FIG. 2, looking in the direction of the arrows;

FIG. 4 is a side elevation, similar to FIG. 2, but showing a modified form of pulley ring;

FIG. 5 is a longitudinal section substantially on the line 5—5 of FIG. 4, looking in the direction of the arrows; and FIG. 6 is a perspective view showing a pair of pulley rings such as illustrated in FIG. 4 mounted on a supporting bar.

Referring to the drawing in detail, one form of our improved pulley ring is shown in FIGS. 2 and 3. The device comprises a substantially inverted U-shaped shackle or clevis 1 formed from solid bar stock, preferably of circular cross section, the ends of the arms of the clevis being enlarged as indicated at 2. These enlarged ends are circular in elevation, as shown in FIG. 3, and have their edges rounded to form a continuation of the rounded surface of the body of the clevis.

Mounted between the ends 2 of the clevis is a roller 3 journaled on a pin 4 extending through openings in arms 2 of the clevis. As clearly shown in FIG. 2, this roller has a length relatively large as compared with its diameter, and has a concave surface throughout such length. The roller occupies the entire space between the arms and the diameter of the ends $3^a$ thereof is substantially no larger than the ends 2 of the clevis. In fact, in FIGS. 2 and 3 the ends of the roller are shown as smaller than the ends of the clevis.

The pin 4 is held in position by slightly upsetting the ends, as shown at $4^a$ in FIG. 2, these upset ends being substantially flush with the outer surface of the arms of the clevis.

The seine or net is shown at A and the purse line at B. This line passes through the clevis 1 and is supported on the rollers 3. The clevises are attached to the lower edge of the net, as by a line C, which is secured to the lower edge thereof at intervals, as shown in FIG. 2 and is formed with a series of bights, each of which is looped around the middle portion or bend of the clevis, as shown at D.

From the foregoing it will be seen that our improved clevis and roller 3 have a rounded smooth surface throughout and are entirely free from any projections such as might snag or foul the line. The purse line B is supported on the rollers 3, as shown, and, due to the fact that these rollers freely turn, both the frictional resistance to the movement of the line and the wear on the line are substantially reduced. A seine equipped with our improved pulley rings is very much easier to purse and the life of the purse line is substantially lengthened.

In FIGS. 4 and 5, we have shown a somewhat modified form of pulley ring having a clevis 1' which is more or less elliptical in shape and comprises an arcuate middle portion and a pair of arms. Like the clevis 1 shown in FIGS. 2 and 3, this clevis 1' is fabricated from solid bar stock of substantially uniform circular cross section throughout, as shown in FIG. 5, and a roller 3 is mounted between the ends of the arms on a pin 4, as before. It will be noted here that the diameter of the ends $3^a$ of the pulley are substantially no larger than the diameter of the ends of the clevis. In fact, the concave surface of the roller 3 forms a practical continuation of the curve of the inside surface of the clevis, so that there is nothing on which the line can hang or foul.

In this modified form of pulley ring, we have provided at the top a rigid bail 5 lying in the plane of the clevis and secured to the outside of the middle arcuate portion thereof, and the bight of the line C is looped through this bail, as shown at D.

In FIG. 6, we have illustrated a bar E, commonly referred to as a "pin," mounted in horizontal position on the boat and on which the clevises may be supported when the seine is being set. Although both forms of clevis can readily be supported on this pin or bar, the form shown in FIGS. 4 and 5 has the advantage that the loop D of the line does not come in contact with the bar and the wear of the line due to such contact is eliminated. Furthermore, in the form shown in FIG. 2, the purse line B, when running at high speed, will sometimes whip up to the top of the clevis and rub against the bight D, thus wearing away such bight and causing it to fail. A further advantage of the form shown in FIGS. 4 and 5 is that this cannot happen, since the bight D is entirely outside of the clevis.

It will be understood that if the roller becomes worn it may readily be replaced. The roller can be removed by knocking out the pin 4 by means of a punch. The same pin, or a new one, may be inserted through the openings in the new roller and the arms of the clevis and its ends again upset to hold it in position.

Although the two modified forms of clevis shown in the drawing differ somewhat in detail, they both embody the same principles of construction, namely, a clevis formed of smooth bar stock preferably circular in cross section, and a roller having a concave surface fitting snugly between the ends of the arms of the clevis and having a diameter substantially no larger than the ends of these arms, thus producing a pulley ring which is completely smooth and free from projections of any kind.

What we claim is:

1. The combination with a purse seine, of a pulley ring associated therewith, said pulley ring comprising a one-piece clevis having an arcuate middle portion and a pair of arms of substantially uniform cross-section throughout, the inside of said clevis being completely smooth and free from projections, a roller mounted between the ends of said arms, a rigid bail fixed to the outside of said arcuate middle portion at a point opposite said roller, the space between the ends of said arms being entirely open and unobstructed except for said roller, and a line looped through said bail and secured to the edge of said seine.

2. The combination with a purse seine, of a plurality of pulley rings associated therewith and a purse line running freely through said pulley rings, each pulley ring comprising a one-piece clevis having an arcuate middle portion and a pair of arms, said middle portion and arms being of substantially uniform cross-section throughout, the inside of said clevis being completely smooth and free from projections, a roller mounted to rotate between the ends of said arms and adapted to support said purse line as it runs through said pulley rings, a rigid bail fixed to the outside of said arcuate middle portion of each clevis at a point opposite said roller and lying in the plane of said clevis, the space between the ends of said arms being entirely open and unobstructed except for said roller, and a line having a bight looped through and around each of said bails and secured to the edge of said seine.

References Cited in the file of this patent

UNITED STATES PATENTS

| | | |
|---|---|---|
| 900,737 | Jackson | Oct. 13, 1908 |
| 2,453,357 | Barkley | Nov. 9, 1948 |
| 2,709,616 | Larson et al. | May 31, 1955 |
| 2,733,530 | Puretic | Feb. 7, 1956 |

FOREIGN PATENTS

| | | |
|---|---|---|
| 83,217 | Norway | Mar. 1, 1954 |